May 20, 1941.     C. B. GRAY     2,242,782
NIBBLING MACHINE
Filed Feb. 4, 1939     4 Sheets-Sheet 1
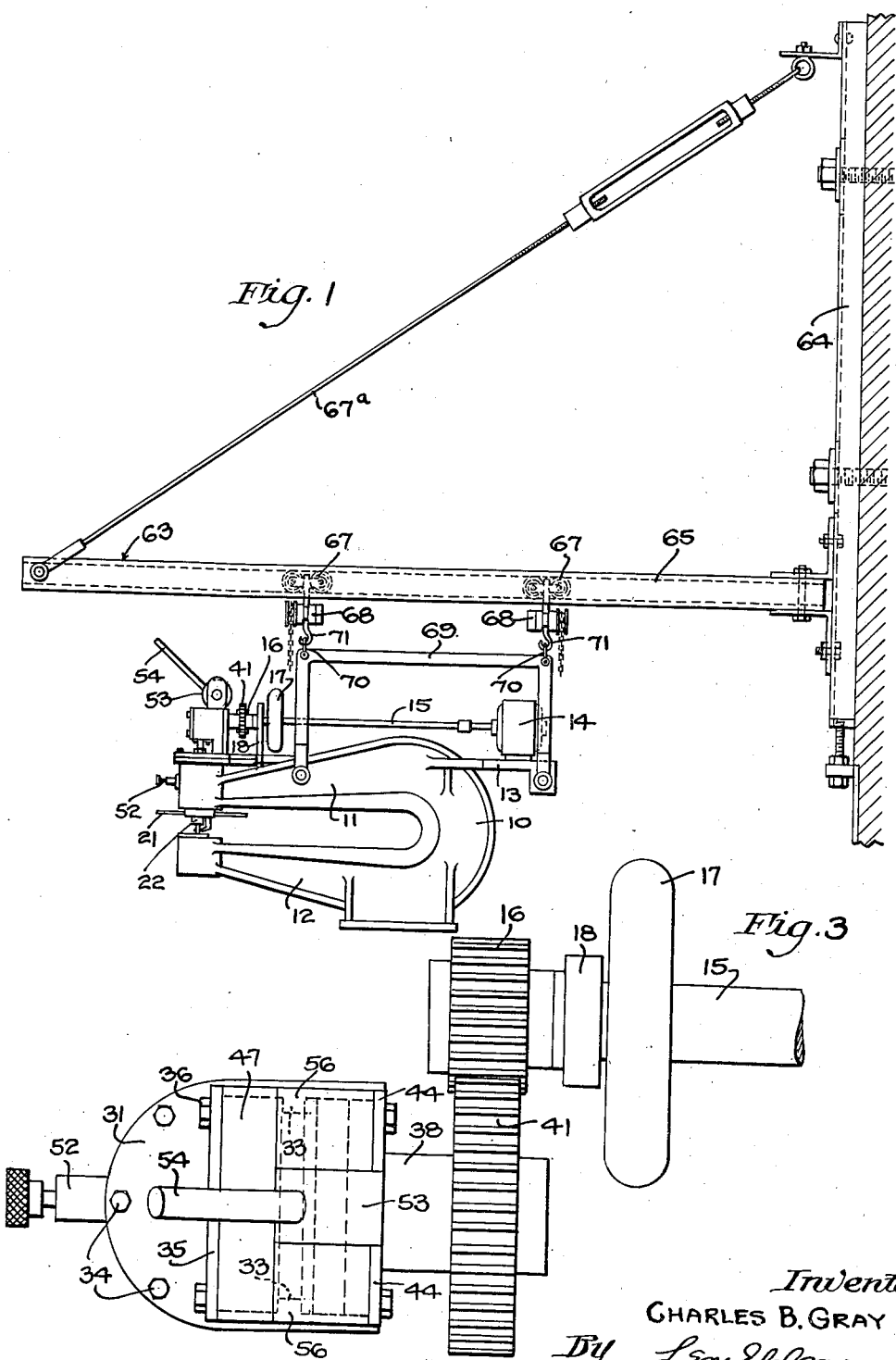
Inventor
CHARLES B. GRAY
By Leon Edelson
Attorney

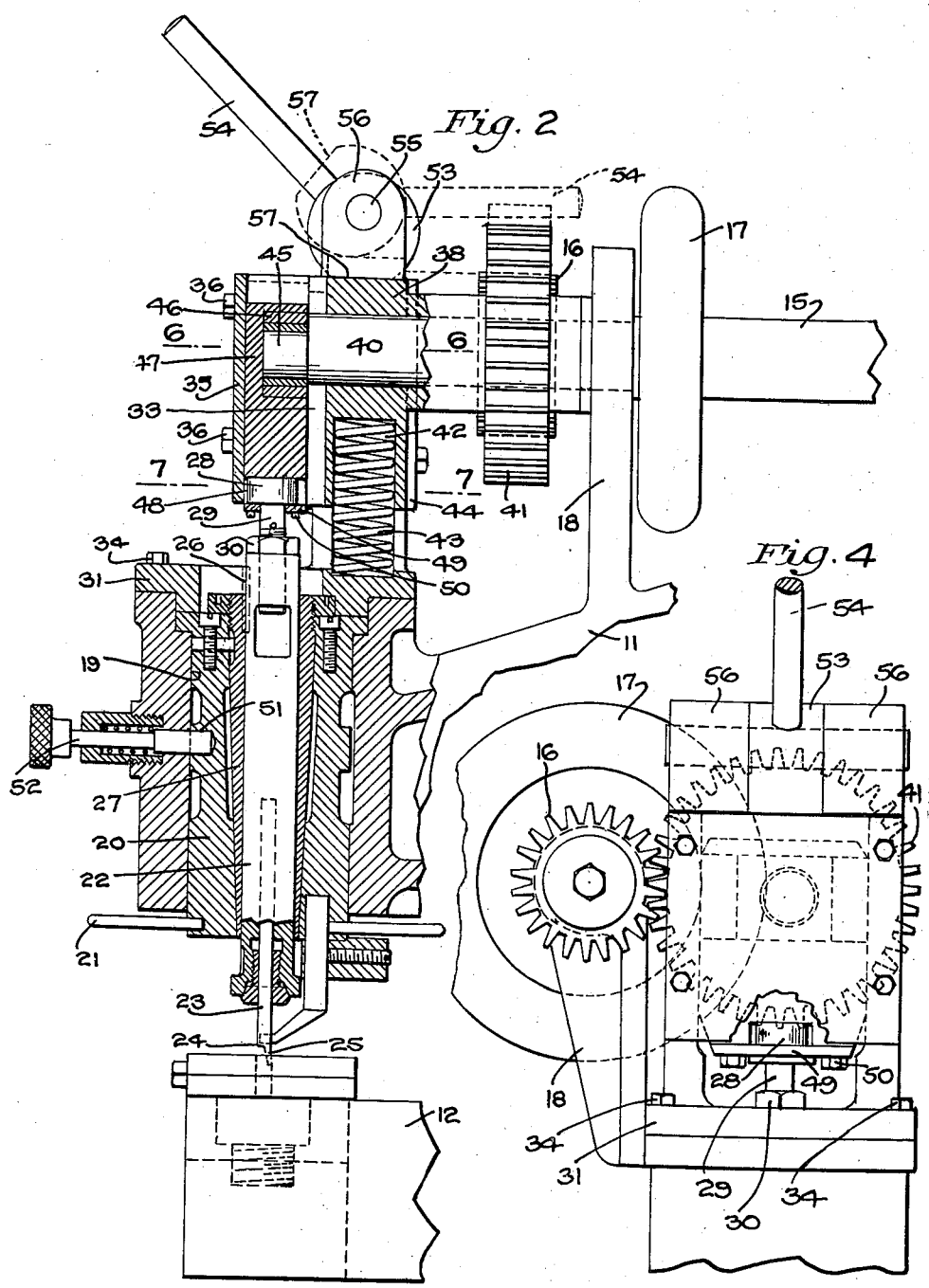

May 20, 1941.　　　　C. B. GRAY　　　　2,242,782
NIBBLING MACHINE
Filed Feb. 4, 1939　　　　4 Sheets-Sheet 3
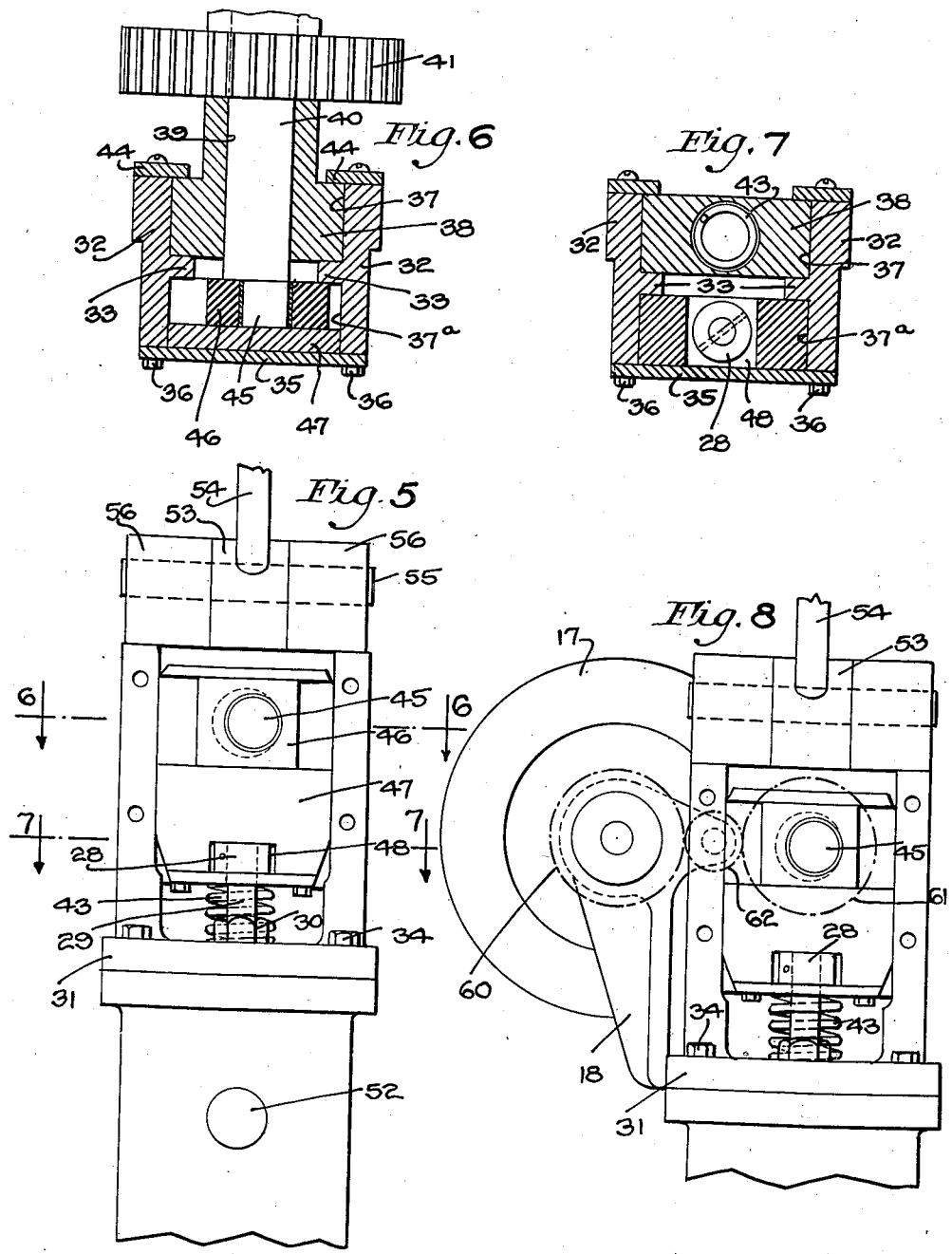
Inventor
CHARLES B. GRAY
By　Lew Edelson
　　　Attorney May 20, 1941.  C. B. GRAY  2,242,782
NIBBLING MACHINE
Filed Feb. 4, 1939  4 Sheets-Sheet 4

Inventor
CHARLES B. GRAY.
By Leon Edelson
Attorney.

Patented May 20, 1941

2,242,782

UNITED STATES PATENT OFFICE 2,242,782

NIBBLING MACHINE

Charles B. Gray, Millbourne, Pa.

Application February 4, 1939, Serial No. 254,530

10 Claims. (Cl. 164—47)

This invention relates to machines for cutting or slotting sheet or plate metal and other such material and more particularly to an improved construction of machines known in the art as a "nibbling" machine, one form of which is shown in my prior Patent No. 1,849,829, granted March 15, 1932. In these nibbling machines a punch and pilot member is employed in such manner that it cooperates with a die to cut a sheet or plate fed through the machine, the pilot member serving to limit the increment or feed. The punch and pilot member is preferably a unitary element which is carried by a vertically reciprocable ram, the latter being rotatable about its vertical or longitudinal axis so as to present the cutting edge of the punch in position to permit cutting or nibbling of the stock in any desired direction.

It is among the objects of the present invention to provide in a nibbling machine of the character just described a simple and effective and yet inexpensive mechanism for rendering the reciprocating cutting tool ineffective to cut the stock without, however, interrupting the operation of the motor or other prime mover which drives the machine.

A further object of the invention is to provide an arrangement wherein the prime mover or operating motor for the nibbling machine is at all times operatively connected to the reciprocating ram by which is carried the cutting tool, the prime mover shaft being so operatively connected to the operating shaft of the vertically reciprocating ram that while the two shafts are in constant entrainment by means of suitably meshed gears the relative positions of the shafts may be changed without effecting disentrainment of their respective meshed gears to render the ram ineffective to perform any cutting or nibbling of the sheet material fed into the machine, the relative movement permitted between the shafts being sufficient to allow the reciprocating ram to be raised vertically to a heighth sufficient to disengage the cutting tool from the materal being cut, thereby eliminating the necessity of any clutch between the prime mover and the reciprocating ram or of any gag mechanism associated with the ram itself for interrupting the cutting operation of the nibbling tool.

More generally, it is an object of the present invention to provide a simple and inexpensive nibbling machine of such compact design and reduced number of operating parts that its cost of manufacture is materially decreased at the same time that the machine is rendered adaptable for uses and in a manner not heretofore thought possible with nibbling machines.

In this latter connection, it is a further and important object of the present invention to provide a nibbling machine which is adapted for overhead support in such manner that the machine may be bodily shifted in various directions within rather wide limits in consequence of which the machine may be fed to and through the stock instead of feeding the stock to and through the machine as is necessary in the case of the conventional stationary nibbling machine. By so providing a nibbling machine which is shiftable to such extent that it may be considered as a semi-portable machine, feeding and handling of extremely large sheets of material to be cut is greatly facilitated and, accordingly, it is among the objects of the present invention to provide a suitable overhead support for a nibbling machine by which the latter may be shifted in a plane paralleling that of the sheet material being cut by the machine.

Other objects and advantages of the invention will be apparent more fully hereinafter, it being understood that the present invention consists substantially in the combination, construction, location and relative arrangement of parts, all as will be more fully apparent hereinafter, as shown in the accompanying drawings and as finally pointed out in the appended claims.

In the said accompanying drawings, which are intended to be illustrative of the principles of the present invention:

Figure 1 is a side elevational view of a nibbling machine constructed and supported in accordance with the principles of the present invention;

Figure 2 is a vertical sectional view of the operating end of the machine;

Figure 3 is a top plan view of the upper front part of the machine;

Figure 4 is a front elevational view of the portion of the machine shown in Figure 3;

Figure 5 is a front elevational view of certain of the parts shown in Figure 4 but with the front cover plate removed;

Figure 6 is a horizontal sectional view taken on the line 6—6 of Figure 5;

Figure 7 is a horizontal sectional view taken on the line 7—7 of Figure 5;

Figure 8 is a view similar to Figure 4 but showing a somewhat modified arrangement of the constantly entrained gears;

Figures 9, 10:
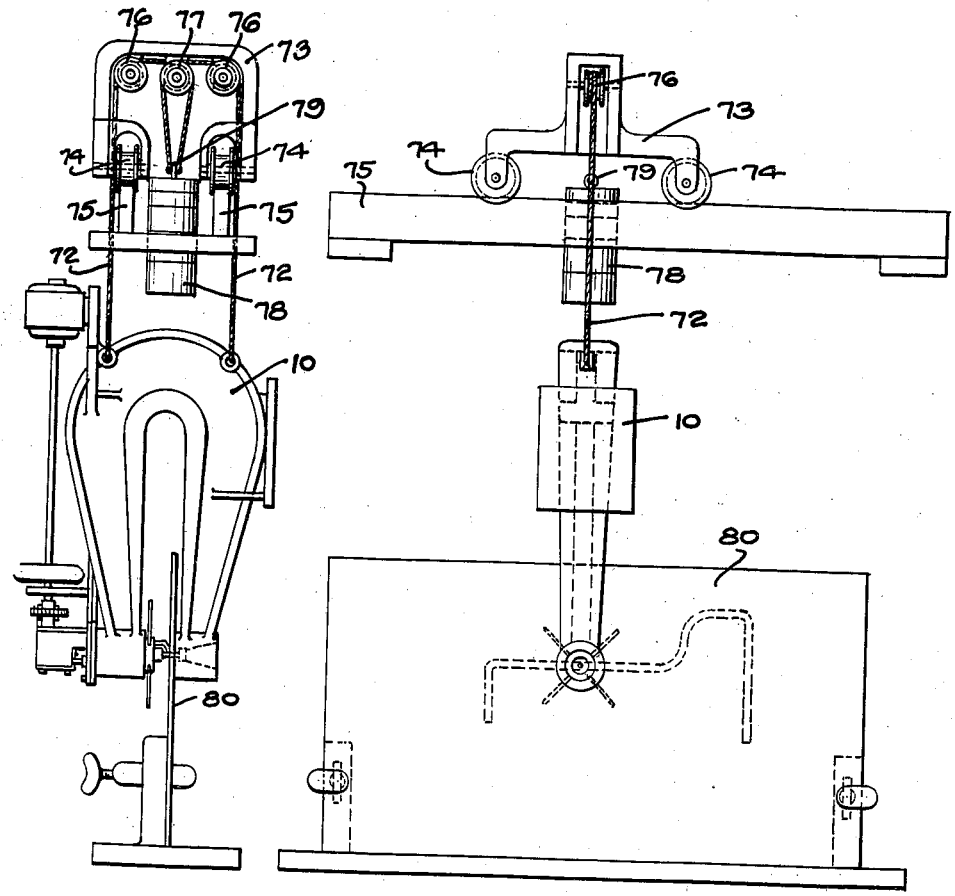
Figure 9 is a front elevational view of a nibbling machine suspended from an overhead support to permit shifting of the machine in a vertical plane.
Figure 10 is a side elevational view of the arrangement shown in Figure 9.

Referring now to the drawings and more particularly to Figures 1 and 2, it will be observed that the nibbling machine of the present invention includes a frame 10 having an upper jaw 11 and a lower jaw 12. The upper jaw is provided at its rear end with a bracket or platform 13 preferably but not necessarily formed as an integral part of the frame casting. Suitably mounted upon this platform 13 is an electric motor 14 for operating the machine, this motor being direct connected to a shaft 15 extending forwardly toward the front of the machine and provided at its forward extremity with a gear 16, this gear 16 being fixed to the shaft 15 for rotation therewith. Secured to the shaft 15 immediately to the rear of the gear 16 is a hand and balance wheel 17. Preferably, the forward end of the motor shaft 15 is journalled in a suitable bearing 18 in the form of a bracket extending upwardly from the frame casting 11.

As appears most clearly in Figures 1 and 2, the forward extremity of the upper jaw 11 of the machine frame 10 is provided with a vertically extending bore 19 of substantial axial dimension. Within this bore is suitably journalled for rotation therein a sleeve 20, this sleeve being provided with suitable handles 21 to facilitate its rotation in one direction or the other. Suitably disposed within the bore of this rotating sleeve or turret 20 is a vertically reciprocating ram 22, the lower end of which carries in any suitable manner the cutting tool 23, this latter tool being preferably of the type having a cutting edge 24 and a depending feed limiting pilot 25. As is well understood in the art, the tool 23 cooperates with a lower die (not shown) fitted in and carried by the forward extremity of the lower jaw 12 of the machine.

The ram 22 is splined, as at 26, to the rotating turret 20 so that while vertical reciprocation of the ram is permitted within the turret 20 the ram is precluded from rotating relatively with respect to the ram but instead is caused to rotate with the latter as a unit. Inasmuch as the ram and turret assembly of the machine illustrated forms no particular part of the present invention, further detailed description thereof is not believed necessary, it being understood that in the machine of the present invention any desired ram and turret assembly may be employed as, for example, the assembly described in my prior Letters Patent No. 1,849,329 and in my copending application Serial No. 132,010, filed March 20, 1937. It may be pointed out in passing, however, that it is desirable to employ as part of the ram and turret assembly a tapered bushing, such as is designated by the reference numeral 27, disposed in intervening relation between the turret 20 and the reciprocating ram 22, this bushing being removably secured within the complementally tapered bore of the turret 20 in any desired manner, the bushing thus forming a part of the turret. It will also be understood that the ram employed in the present machine is characteristically provided at its upper extremity with a swivel head 28 which serves to operatively connect the ram to the vertically reciprocating head of the machine in such manner that the ram may be rotated angularly about its axis of reciprocation without disrupting the operative connection between the ram and the vertically reciprocating head of the machine. This swivel head 28 includes a stem 29 which is threadedly connected to the upper end of the ram 22 in such manner that the latter may be vertically adjusted as desired, a nut lock 30 being provided to maintain the ram in its vertically adjusted position.

Referring now to the mechanism for effecting vertical reciprocation of the ram within the turret 20, it will be observed that the forward extremity of the upper jaw 11 serves not only as a support for the turret and ram assembly but also as a support for a vertically extending guide for the mechanism which imparts vertical reciprocation to the ram 22. This guide generally comprises a base 31 having a pair of oppositely disposed substantially parallel side walls 32—32 (see Figures 6 and 7), the inner faces of these side walls 32—32 being provided with integrally formed ribs 33—33. The base 31 of the upper guide is secured to the upper surface of the front extremity of the frame jaw 11 by means of bolts 34 (see Figures 2, 4 and 5), while the front of the guide is adapted to be closed by a cover plate 35 secured in position by the bolts 36.

As appears most clearly in Figures 2, 6 and 7, the internal vertical ribs 33—33 provided on the inner faces of the side wall of the upper guide provide a pair of laterally spaced guide runs 37 and 38. Disposed within the guide run 37 is a vertically shiftable shaft bearing block 38, this block being transversely bored, as at 39, to provide a horizontal bearing for the shaft 40 which extends in parallel relation to the main driven shaft 15. The inner end of this shaft 40 is fitted with a gear 41 which loosely meshes with the gear 16 secured to the forward end of the main driven shaft 15. The vertically shiftable shaft bearing block 38 is provided in the lower end thereof with a recess or socket 42 within which is accommodated the upper portion of a coiled compression spring 43, the lower end of this spring bearing against the bottom supporting plate or base 31 of the upper guide assembly. This coil spring 43 is of sufficient strength to normally cause the shaft bearing block 38 to assume the elevated position shown in dotted lines in Figure 2, in which position the axes of the shafts 15 and 40 are vertically offset with respect to each other, but to an extent insufficient to effect disengagement of the gears 16 and 41. In order to retain the bearing block 38 against lateral displacement with respect to its vertical guide run, retaining plates 44—44 are employed as shown in Figures 2, 6 and 7.

As appears most clearly in Figure 2, the outer or forward end of the shaft 40 is provided with a reduced eccentric portion 45 which projects into and coacts with a shoe 46 to impart vertical reciprocation to the sliding block 47 upon rotation of the shaft 40. This sliding block is disposed for vertical reciprocation within the guide run 38 and is secured in any suitable manner to the swivel head 28 of the ram assembly. Preferably, this swivel head 28 is disposed in a socket 48 formed in the bottom of the sliding block 47, the swivel head being rotatably retained within said socket 48 by means of a slotted plate 49 secured to the bottom of the guide run 38 by means of securing bolts 50. By the arrangement just described, it will be observed that the rotary motion of the shaft 40 is converted into reciprocatory motion of the sliding block 12 in consequence of which it will be apparent that upon rotation of the shaft 40 the ram assembly is reciprocated vertically within its supporting sleeve or turret 20.

It will also be apparent that by reason of the swivel connection afforded between the ram and the upper sliding block 47, the ram may be rotated angularly about its axis without interrupting its reciprocatory motion, this angular rotation being effected, of course, by means of the handle-equipped turret 20 which is splined to the ram, as at 26. Provided in the turret 20 intermediate the upper and lower extremities thereof are a series of circumferentially spaced recesses 51 for receiving the inner end of a spring pressed locking pin 52, this pin being adapted for projection into any one of the said recesses to lock the turret against rotation in any desired angularly adjusted position, in consequence of which the ram is likewise locked in such adjusted position.

Secured to the stationary guide for the shaft bearing block is a mounted cam member 53 to which is fitted an operating handle 54. Preferably, this cam member 53 which is pivoted, as at 55, between a pair of upstanding lugs or ears 56—56 is provided in its periphery with a flattened portion 57, this flattened portion of the cam being adapted to engage the upper end of the shaft bearing block 38 when the cam is shifted into the full line position shown in Figure 2 to maintain said block 38 in the depressed position shown against the action of the compression spring 43.

Reference has heretofore been made to the fact that the gears 16 and 41 respectively fixed to the proximate ends of the laterally offset but parallel shafts 15 and 40 are in more or less loosely meshed engagement. The reason for this is that regardless of the position assumed by the shaft bearing block 38, that is, whether in its elevated position shown by the dotted lines in Figure 2 or in its depressed full-line position as shown in that figure, the gears 16 and 41 remain in mesh in consequence of which the ram continues to reciprocate so long as the motor operates and effects rotation of the main driving shaft 15. However, when the cam 53 is rotated into the dotted line position shown in Figure 2, thereby permitting the shaft bearing block 38 to move upwardly under the influence of the coiled compression spring 43, the reciprocating sliding block 47 is correspondingly raised, with the result that the ram and the tool 23 are raised out of work engaging position. The tool continues to reciprocate, however, and when it is desired to resume the cutting of the sheet material fed through the machine, it is only necessary to shift the cam 53 into the full-line position shown in Figure 2 whereupon the shaft bearing block 38 and the reciprocating sliding head 47 are depressed as a unit to an extent sufficient to cause the tool to operatively engage the stock.

In the arrangement shown in Figures 1 to 4, inclusive, the gears 16 and 41 are in direct engagement with one another and their ratio is such as to cause the driven shaft 40 to rotate at a speed slower than that of the driving shaft 15. It will be understood, of course, that this gear ratio may be changed as desired and in Figure 8 there is illustrated an arrangement wherein the driving gear 60 is geared to the driving gear 61 through the intervention of an intermediate gear 62. In this arrangement shown in Figure 8 the ratio of the gears 60 and 61 is one to one but obviously any other ratio may be obtained by the simple expedient of changing the gear relations.

In order to facilitate the cutting of large sheets of material, it is a feature of the present invention that the machine hereinbefore described is mounted upon an overhead support in such manner that the machine may be shifted readily with respect to the work instead of vice versa as has been the case heretofore. As most clearly appears in Figure 1, this important objective is obtained by suspending the nibbling machine upon a jib crane designated generally by the reference numeral 63. This crane essentially consists of a vertical support 64 which is fixedly secured in position in any suitable manner and a horizontally extending member 65 which is pivoted to the vertical support, as at 66. The outer free extremity of the horizontal member 65 is supported by an inclined guy member 67ª, the arrangement being such that the horizontal member 65 may be swung freely in a horizontal plane about its pivot 66.

The horizontal member is preferably in the form of a track within which is received a pair of trolleys 67—67 respectively equipped with depending chain hoists 68—68. The nibbling machine itself is provided with a suitable supporting bracket or frame 69 having longitudinally spaced eyes 70—70 which respectively engage the hooks 71—71 of the chain hoists. It will be apparent that by means of the arrangement just described, the nibbling machine may be bodily shifted lengthwise of the track 65, lowered or raised by means of the chain hoists 68, or swung laterally from one side or the other about the pivot 66 as an axis. Also, by proper manipulation of the chain hoists 68—68, the nibbling machine may be so inclined or tilted that the axis of the reciprocation of its cutting tool extends at all times perpendicularly to the plane of the sheet material being cut, as when such material is by necessity fed along an inclined plane, thereby insuring proper feed and cutting of the stock. The jib crane support for the machine thus imparts to it a capability for universal positional adjustment which renders it semi-portable in effect and provides for the cutting of sheet material with such facility and ease as is not possible with ordinary stationarily mounted machines of even the largest capacity.

In the arrangement shown in Figure 1 the nibbling machine is suspended from its overhead support in such manner that its shifting movement is generally confined to a horizontal plane or to a plane inclined somewhat with respect to the horizontal. In such arrangement, the sheet material being cut is supported horizontally and by shifting the machine in various directions any desired outline or shape may be cut out of or in the horizontally supported stock.

There may be instances, however, where it is expedient or even necessary to support the sheet material in a vertical plane and in such event the machine may be suspended from an overhead support in the manner shown in Figures 9 and 10. In the arrangement shown in these latter figures, the nibbling machine 10 is suspended, by means of the cables 72—72, from an overhead carriage 73, the latter being in turn equipped with laterally spaced roller wheels 74—74 which respectively travel along a pair of fixed overhead tracks 75—75. The supporting cables 72—72 respectively pass over suitable pulleys or shives 76—76 carried by the carriage 73 and thence over the intermediate pulley or shive 77 to a counterbalancing weight 78, the latter being secured to the upper extremities of the cables, as at 79. The counterbalanced machine may be shifted vertically about the pulleys 76—76—77 as well as horizontally along the tracks 75—75 so that by easy manipulation thereof a large sheet, such as 80, may be cut along the irregular line as indicated in Figure 10 without moving the sheet at all.

While in the arrangements hereinbefore described and illustrated in the accompanying drawings a nibbling machine is shown as being suspended from an overhead support in such manner that it may be shifted relatively to the work in a plane paralleling that of the sheet material being cut, it will be obvious that these arrangements for overhead support are equally applicable to machines other than nibbling machines, as, for example, shearing machines, and accordingly it is to be understood that it is not intended to limit the overhead support arrangements for use in connection with any particular type of sheet metal cutting machine.

It will be understood, of course, that the invention is susceptible of various changes which may be made from time to time without departing from the real spirit or general principles thereof and it is accordingly intended to claim the same broadly, as well as specifically, as indicated by the appended claims.

What is claimed as new and useful is:

1. In a cutting machine of the character described, in combination, a reciprocable ram, a reciprocating block disposed above and connected to said ram, a rotatably journalled shaft operatively associated with said block and having means for converting rotary motion to said shaft into reciprocatory motion of said block, a second shaft laterally offset from said first-mentioned shaft and adapted to be rotated by a prime mover, and a pair of gears respectively fixed to said shafts and in engagement with each other, the said gears being relatively so arranged as to permit vertical displacement of said first mentioned shaft with respect to said second shaft without effecting disentrainment of said gears.

2. In a cutting machine of the character described, a frame having upper and lower arms, a fixed guide provided in said upper arm, a vertically reciprocable ram disposed within said guide, and means for effecting reciprocation of said ram, said means including a power driven shaft, a second shaft disposed in parallel relation to said power driven shaft, gears respectively fixed to said shafts and arranged in constant entrainment, means intervening said second shaft and said ram for imparting reciprocation to the latter upon rotation of the former, and means for depressing or elevating said reciprocating ram without effecting disentrainment of said gears or interrupting the reciprocation of said ram.

3. In a metal cutting tool of the character described, in combination, a ram having at one end thereof a tool adapted to coact with a fixed die, and means for effecting reciprocation of said ram, said means including a pair of shafts disposed in parallel relation, one of said shafts being power driven and the other of said shafts being operatively connected to said reciprocating ram, gears respectively secured to said shafts and arranged in constant entrainment, a bearing for that one of said shafts which is operatively connected to said reciprocating ram, and means for elevating or depressing said bearing to correspondingly elevate or depress said reciprocating ram without interrupting the reciprocation of the latter and without effecting disentrainment of said gears.

4. In a metal cutting tool of the character described, in combination, a pair of shafts arranged in laterally spaced parallel relation, one of said shafts being power driven and the other of said shafts being journalled for rotation within a vertically shiftable bearing member, a pair of gears respectively fixed to and rotatable with said shafts, said gears being maintained in constant entrainment, means for connecting the shaft which is journalled in said shiftable bearing to a vertically reciprocable ram assembly, and means for elevating or depressing said bearing member to correspondingly elevate or depress said ram assembly without interrupting its reciprocation or effecting disentrainment of said gears.

5. In a metal cutting tool of the character described, in combination, a pair of shafts arranged in laterally spaced parallel relation, one of said shafts being power driven and the other of said shafts being journalled for rotation within a vertically shiftable bearing member, a pair of gears respectively fixed to and rotatable with said shafts, said gears being maintained in constant entrainment, means for connecting the shaft which is journalled in said shiftable bearing to a vertically reciprocable ram assembly, and means for elevating or depressing said bearing member to correspondingly elevate or depress said ram assembly without interrupting its reciprocation or effecting disentrainment of said gears, said last-mentioned means including a coil compression spring which tends constantly to elevate said bearing member.

6. In a metal cutting tool of the character described, in combination, a pair of shafts arranged in laterally spaced parallel relation, one of said shafts being power driven and the other of said shafts being journalled for rotation within a vertically shiftable bearing member, a pair of gears respectively fixed to and rotatable with said shafts, said gears being maintained in constant entrainment, means for connecting the shaft which is journalled in said shiftable bearing to a vertically reciprocable ram assembly, means for elevating or depressing said bearing member to correspondingly elevate or depress said ram assembly without interrupting its reciprocation or effecting disentrainment of said gears, said last-mentioned means including a coil compression spring which tends constantly to elevate said bearing member, and cam means for locking said bearing member in depressed position against the action of said compression spring.

7. In a metal cutting tool of the character described, in combination, a vertically reciprocable ram having at one end thereof a tool adapted to coact with a fixed die to cut material fed therebetween, a sliding block having a horizontal groove in one face and connected to the upper extremity of said ram, a fixed guideway embracing the opposing lateral edges of said block, a rotatable eccentric shaft operating in the groove of said block for effecting reciprocation of the latter upon rotation of said shaft, a bearing in which said shaft is journalled, and means for elevating said bearing rectilinearly and along a line paralleling the axis of said reciprocable ram, as desired, whereby to correspondingly elevate said shaft and the sliding block and ram associated therewith without changing their normal relationship.

8. In a metal cutting tool of the character described, in combination, a bearing block for a rotatable shaft, spring means tending normally to urge said block upwardly, cam means operative to maintain said block in lowered position against the action of said spring means, a shaft journalled in said block and having at its outer extremity an eccentric, a sliding block operatively associated with said eccentric and adapted for reciprocable motion upon rotation of said shaft, a reciprocable ram operatively associated with said sliding block for reciprocation with the latter, means for imparting rotation to said shaft, and means permitting raising or lowering of said shaft bearing block together with said shaft and the sliding block associated with the latter without interrupting the rotation of said shaft and while maintaining said shaft perpendicular to the path of movement of said ram.

9. In a metal cutting tool of the character described, in combination, a reciprocable ram having at one end thereof a tool adapted to coact with a fixed die to cut material fed therebetween, a sliding block connected to the upper end of said ram, a motor, and means for transmitting power from said motor to said sliding block and ram, said means comprising a rotatable eccentric shaft connected with said block for reciprocating the same, a bearing in which said shaft is journalled, and means for rectilinearly displacing said bearing and the full length of said shaft from one position to another, while maintaining said block and ram in operative connection with said motor and while maintaining the axis of the shaft parallel to the axis of the shaft in the starting position.

10. In a metal cutting tool of the character described, in combination, a reciprocable ram having at one end thereof a tool adapted to coact with a fixed dye to cut material fed therebetween, a sliding block connected to the upper end of said ram, a driving shaft, a driven shaft receiving power from said driving shaft, means connecting said driven shaft with said block to reciprocate said block by the rotation of driving and driven shafts, a bearing for said driven shaft, said bearing and driven shaft having two extreme positions, the axis of the shaft in one position being parallel to the axis of the shaft in the other position, and means for moving said bearing and driven shaft from one position to the other without interrupting the reciprocation of said ram and block.

CHARLES B. GRAY.